(12) United States Patent
Kiyohiro et al.

(10) Patent No.: US 8,685,577 B2
(45) Date of Patent: Apr. 1, 2014

(54) FUEL CELL SYSTEM AND METHOD OF CONTROLLING THE FUEL CELL SYSTEM

(75) Inventors: Yukihiko Kiyohiro, Wako (JP); Tetsuya Ogawa, Wako (JP); Ayatoshi Yokokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/637,156

(22) PCT Filed: Mar. 15, 2011

(86) PCT No.: PCT/JP2011/056677
§ 371 (c)(1),
(2), (4) Date: Sep. 25, 2012

(87) PCT Pub. No.: WO2011/132486
PCT Pub. Date: Oct. 27, 2011

(65) Prior Publication Data
US 2013/0029235 A1   Jan. 31, 2013

(30) Foreign Application Priority Data
Apr. 21, 2010   (JP) ................ 2010-098219

(51) Int. Cl.
*H01M 8/06*   (2006.01)

(52) U.S. Cl.
USPC ........... 429/414; 429/444; 429/427; 429/428; 429/440; 429/437; 429/434; 429/442; 429/443; 429/450; 429/452; 429/413; 429/83; 429/433

(58) Field of Classification Search
None
See application file for complete search history.

(56) References Cited

U.S. PATENT DOCUMENTS

| 7,645,533 B2 * | 1/2010 | Fukuda ................. 429/434 |
| 2003/0143447 A1 * | 7/2003 | Akimoto et al. ........ 429/23 |
| 2006/0141331 A1 * | 6/2006 | Reiser et al. ........... 429/38 |
| 2009/0297900 A1 | 12/2009 | Higuchi |

FOREIGN PATENT DOCUMENTS

| JP | 2001-325982 | 11/2001 | |
| JP | 2003-132928 | 5/2003 | |
| JP | 2003-187843 | 7/2003 | |
| JP | 2006-024430 | 1/2006 | |
| JP | 2007-035483 | 2/2007 | |
| WO | 2007/052633 | 5/2007 | |
| WO | WO 2009063283 A2 * | 5/2009 | ............ H01M 8/04 |

OTHER PUBLICATIONS

Japanese Office Action, Publication No. 2010-098219, dated Nov. 19, 2013, with partial English translation, 4 pages.

* cited by examiner

*Primary Examiner* — Milton I Cano
*Assistant Examiner* — Wojciech Haske
(74) *Attorney, Agent, or Firm* — Rankin, Hill & Clark LLP

(57) ABSTRACT

A fuel cell system includes a fuel cell module and a condenser apparatus. The condenser apparatus includes a first condenser using an oxygen-containing as a coolant, and a second condenser using hot water stored in a hot water tank as the coolant. Further, the fuel cell system includes a control device for controlling at least one of a flow rate of the exhaust gas supplied to the first condenser and a flow rate of the exhaust gas supplied to the second condenser based on at least any of a water level of the hot water in the hot water tank, a temperature of the hot water in the hot water tank, and a water level of the condensed water in the condenser apparatus.

22 Claims, 8 Drawing Sheets

FIG. 3

| Q: WATER LEVEL / T: TEMPERATURE | UNDER | WITHIN RANGE | OVER |
|---|---|---|---|
| UNDER | A WATER COOLING | B WATER COOLING | C WATER COOLING |
| WITHIN RANGE | D WATER COOLING | E WATER COOLING | F AIR COOLING (Fa WATER COOLING) |
| OVER | G WATER COOLING | H AIR COOLING (Ha WATER COOLING) | I AIR COOLING (Ia WATER COOLING) |

FUEL CELL SYSTEM AND METHOD OF CONTROLLING THE FUEL CELL SYSTEM

TECHNICAL FIELD

The present invention relates to a fuel cell system including a fuel cell module for generating electricity by electrochemical reactions of a fuel gas and an oxygen-containing gas, and a condenser apparatus for condensing water vapor in an exhaust gas discharged from the fuel cell module, by heat exchange between the exhaust gas and a coolant to recover the condensed water, and supplying the condensed water to the fuel cell module. Further, the present invention relates to a method of controlling the fuel cell system.

BACKGROUND ART

Typically, a solid oxide fuel cell (SOFC) employs a solid electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a reformed raw material gas is obtained from hydrocarbon raw material of a fossil fuel or the like, such as methane or LNG, and the reformed raw material gas undergoes, e.g., steam reforming to produce a reformed gas (fuel gas).

The operating temperature of the fuel cell of this type is relatively high. Therefore, an exhaust gas therefrom containing a fuel gas and an oxygen-containing gas that have been consumed in the power generation reaction are hot. Thus, it is desired to effectively utilize the exhaust gas. In this regard, for example, a fuel cell system disclosed in Japanese Laid-Open Patent Publication No. 2006-024430 is known.

As shown in FIG. 7, this fuel cell system includes a solid oxide fuel cell $1a$, a heat exchanger $2a$ for performing heat exchange between the exhaust gas from the solid oxide fuel cell $1a$ and water, a hot water tank $3a$ for storing water, a circulation pipe $4a$ connecting the bottom of the hot water tank $3a$ and the heat exchanger $2a$ and connecting an upper portion of the hot water tank $3a$ and the heat exchanger $2a$ to circulate water between the hot water tank $3a$ and the heat exchanger $2a$, a circulation pump $5a$ provided in the circulation pipe $4a$ for forcibly circulating the water, temperature detectors $6a$, $7a$ for detecting the temperature of water at the inlet and the outlet of the heat exchanger $2a$, and a control device $8a$ for controlling the output of the circulation pump $5a$ such that the temperature of the water at the outlet of the heat exchanger $2a$ becomes higher than the temperature of the water at the inlet of the heat exchanger $2a$ by a predetermined temperature.

Further in a fuel cell system disclosed in International Publication No. WO 2007/052633, as shown in FIG. 8, a solid oxide fuel cell $1b$, a heat exchanger $2b$ for performing heat exchange between an exhaust gas from the solid oxide fuel cell $1b$ and water, a hot water tank $3b$ for storing water, a circulation pipe $4b$ for circulating water between the hot water tank $3b$ and the heat exchanger $2b$, a circulation pump $5b$ provided in the circulation pipe $4b$, and a control device $6b$ for controlling the fuel utilization ratio during power generation of the solid oxide fuel cell $1b$ in correspondence with the amount of hot water to be used are provided.

Further, in a fuel cell system and a cogeneration system disclosed in Japanese Laid-Open Patent Publication No. 2003-187843, a fuel cell unit, an exhaust gas combustion unit, and a first heat exchanger unit are provided. The fuel cell unit is connected to electric loads. The fuel cell unit generates fuel cell electrical energy by consuming a fuel gas and an oxygen-containing gas, and supplies the electrical energy to the electric loads. The exhaust gas combustion unit combusts the fuel gas and the oxygen-containing gas consumed in the fuel gas unit to produce a combustion exhaust gas. The first heat exchanger unit recovers heat from the combustion exhaust gas through a heat medium.

The fuel cell unit is operated continuously at a predetermined temperature or more so that electrical energy generated in the fuel cell can be supplied to the electric loads even if no electrical energy is required for the electric loads. The heat is supplied to heat utilization equipment which utilizes the heat medium.

SUMMARY OF INVENTION

However, in Japanese Laid-Open Patent Publication No. 2006-024430, if the temperature of the water in the hot water tank $3a$ becomes high, supply of the hot water is stopped or supply of the exhaust gas is stopped. Therefore, the hot exhaust gas is discharged wastefully. Further, it is difficult to condense the water component in the exhaust gas and then achieve perfect circulation of the water required for reforming (water self-sustaining operation).

Further, International Publication WO 2007/052633 is directed to control the fuel utilization ratio during power generation. Therefore, in the case where the hot water is fully stored in the hot water tank $3b$, or the temperature of the hot water in the hot water tank $3b$ becomes high, water self-sustaining operation and supply of the required electrical energy to the loads may not be performed, and the hot water may not be maintained.

Further, Japanese Laid-Open Patent Publication No. 2003-187843 is intended to improve the energy efficiency even in the time zone when electrical energy required by the loads and heat energy required by the loads are small. Therefore, in the case where the hot water is fully stored in the hot water tank, or the temperature of the hot water in the hot water tank becomes high, water self-sustaining operation and supply of the required electrical energy to the loads may not be performed, and the hot water may not be maintained.

The present invention has been made to solve the problems of this type, and an object of the present invention is to provide a fuel cell system and a method of controlling the fuel cell system in which the whole amount of the water required for operation can be supplied, and electrical energy required for loads can be supplied reliably regardless of the capacity of a hot water tank and a state of the hot water in the hot water tank.

The present invention relates to a fuel cell system including a fuel cell module for generating electricity by electrochemical reactions of a fuel gas and an oxygen-containing gas, and a condenser apparatus for condensing water vapor in an exhaust gas discharged from the fuel cell module by heat exchange between the exhaust gas and a coolant to recover the condensed water, and supplying the condensed water to the fuel cell module.

The condenser apparatus includes a first condenser using the oxygen-containing gas as the coolant and a second condenser using hot water stored in a hot water tank as the coolant. Further, the fuel cell system includes a control device for controlling at least one of a flow rate of the exhaust gas supplied to the first condenser and a flow rate of the exhaust gas supplied to the second condenser based on at least any of a water level of the hot water in the hot water tank, a temperature of the hot water in the hot water tank, and a water level of the condensed water in the condenser apparatus.

Further, the present invention relates to a method of controlling a fuel cell system including a fuel cell module for generating electricity by electrochemical reactions of a fuel gas and an oxygen-containing gas and a condenser apparatus for condensing water vapor in an exhaust gas discharged from the fuel cell module by heat exchange between the exhaust gas and a coolant to recover the condensed water, and supplying the condensed water to the fuel cell module. The condenser apparatus includes a first condenser using the oxygen-containing gas as the coolant and a second condenser using hot water stored in a hot water tank as the coolant.

The method includes the steps of detecting at least any of a water level of the hot water in the hot water tank, a temperature of the hot water in the hot water tank, and a water level of the condensed water in the condenser apparatus, and controlling at least one of a flow rate of the exhaust gas supplied to the first condenser and a flow rate of the exhaust gas supplied to the second condenser based on the water level of the hot water, the temperature of the hot water, and the water level of the condensed water detected in the detecting step.

In the present invention, the first condenser serving as an air cooling condenser using the oxygen-containing gas as the coolant and the second condenser serving as a water cooling condenser using the hot water as the coolant are provided. The first condenser and the second condenser are used selectively, or used at the same time for recovering heat energy from the exhaust gas suitably. In the structure, it becomes possible to perform water self-sustaining operation, and reduction in the temperature of the exhaust gas is achieved.

Further, the power generation output is not affected by the state of the hot water, i.e., and the temperature and the amount of the hot water. Therefore, the required electrical energy is supplied to the loads reliably.

Further, start and stop operations of the fuel cell module are cut down as much as possible, regardless of the capacity of the hot water tank. Therefore, improvement in the power generation efficiency is achieved easily.

Moreover, based on the state of the hot water and/or the state of the condensed water (amount of the condensed water), the flow rate of the exhaust gas supplied to the first condenser and the flow rate of the exhaust gas supplied to the second condenser are controlled. Thus, a desired temperature of the hot water in the hot water tank can be maintained reliably.

In the specification, water self-sustaining operation means operation where the whole amount of the water required for operation of the fuel cell system can be supplied by the fuel cell system itself without any supply of water from the outside.

The above and other objects, features and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 3 is a control map for the control method;

DESCRIPTION OF EMBODIMENTS

A fuel cell system 10 for carrying out a control method according to a first embodiment of the present invention is used in various applications, including stationary and mobile applications. For example, the fuel cell system 10 is mounted on a vehicle.

Figure 1:
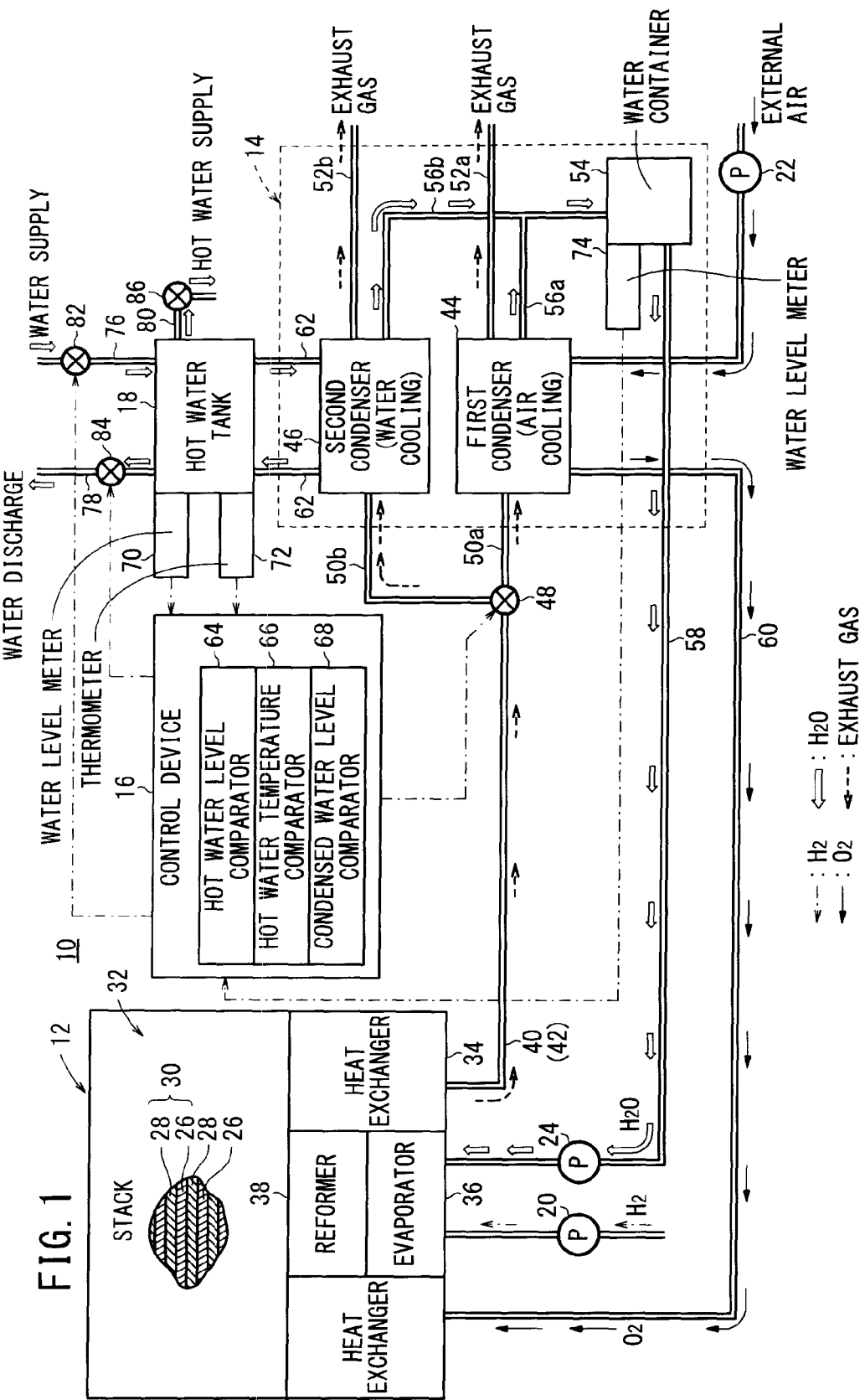
FIG. 1 is a diagram schematically showing a fuel cell system according to a first embodiment of the present invention.

As shown schematically in FIG. 1, the fuel cell system 10 includes a fuel cell module 12 for generating electricity by electrochemical reactions of a fuel gas (hydrogen gas) and an oxygen-containing gas (air), and a condenser apparatus 14 for condensing water vapor in an exhaust gas discharged from the fuel cell module 12 by heat exchange between the exhaust gas and coolant to recover the condensed water and supplying the condensed water to the fuel cell module 12, and a hot water tank (storage unit) 18 for storing water as the coolant.

The fuel cell module 12 is connected to a fuel gas supply apparatus (including a fuel gas pump) 20 for supplying a raw fuel (e.g., city gas) to the fuel cell module 12, an oxygen-containing gas supply apparatus (including an air pump) 22 for supplying an oxygen-containing gas to the fuel cell module 12, and a water supply apparatus (including a water pump) 24 for supplying water to the fuel cell module 12.

The fuel cell module 12 includes a solid oxide fuel cell stack 32 formed by stacking a plurality of solid oxide fuel cells 30 in a vertical direction (or a horizontal direction). The fuel cells 30 are formed by stacking an electrolyte electrode assemblies 26 and separators 28. Each of the electrolyte electrode assemblies 26 includes an anode, a cathode, and a solid electrolyte (solid oxide) interposed between the anode and the cathode. Though not shown, the solid electrolyte is made of ion-conductive solid oxide such as stabilized zirconia.

A heat exchanger 34 for heating the oxygen-containing gas before it is supplied to the fuel cell stack 32, an evaporator 36 for evaporating water to produce a mixed fuel of the raw fuel chiefly containing hydrocarbon and the water vapor, and a reformer 38 for reforming the mixed fuel to produce a fuel gas (reformed gas) are provided at a lower end (or an upper end) of the fuel cell stack 32 in the stacking direction.

The reformer 38 is a preliminary reformer for reforming higher hydrocarbons ($C_{2+}$) such as ethane ($C_2H_6$), propane ($C_3H_8$), and butane ($C_4H_{10}$) in the city gas (fuel gas) to produce a fuel gas chiefly containing methane ($CH_4$) by steam reforming, and the reformer 38 is operated at an operating temperature of several hundred ° C.

The operating temperature of the fuel cell 30 is as high as several hundred ° C. In the electrolyte electrode assembly 26, methane in the fuel gas is reformed to produce hydrogen, and the hydrogen is supplied to the anode.

In the heat exchanger 34, a consumed reactant gas (hereinafter also referred to as the exhaust gas or the combustion exhaust gas) discharged from the fuel cell stack 32 and the air to be heated flow in a counterflow manner for exchanging heat between the consumed reactant gas and the air. The exhaust gas after the heat exchange is discharged to an exhaust pipe 40, and the air after the heat exchange is supplied to the fuel cell stack 32 as an oxygen-containing gas.

The outlet of the evaporator 36 is connected to the inlet of the reformer 38, and the outlet of the reformer 38 is connected to a fuel gas supply passage (not shown) of the fuel cell stack 32. A main exhaust pipe 42 is provided for discharging the exhaust gas supplied to the evaporator 36. The main exhaust pipe 42 is formed integrally with an exhaust pipe 40.

The condenser apparatus 14 includes a first condenser 44 using the oxygen-containing gas as a coolant, and a second condenser 46 using hot water stored in the hot water tank 18 as the coolant. A regulator valve 48 is provided in the exhaust pipe 40 extending from the fuel cell module 12. The exhaust pipe 40 is branched into two exhaust gas channels 50a, 50b at the outlet of the regulator valve 48. The first condenser 44 is connected to the exhaust gas channel 50a, and the second condenser 46 is connected to the exhaust gas channel 50b.

The regulator valve 48 regulates the flow rate of the exhaust gas supplied to the first condenser 44 and the flow rate of the exhaust gas supplied to the second condenser 46. The exhaust gas may be supplied only to the first condenser 44, the exhaust gas may be supplied only to the second condenser 46, or the exhaust gas may be supplied to the first condenser 44 and the second condenser 46 at a predetermined ratio (which is variable).

Exhaust gas channels 52a, 52b for discharging the exhaust gas and condensed water channels 56a, 56b for supplying the condensed water to a water container 54 are provided at the outlets of the first condenser 44 and the second condenser 46. The water container 54 stores the condensed water, and the water container 54 is connected to the water supply apparatus 24 through a water channel 58.

An air supply pipe 60 is connected to the first condenser 44 and the oxygen-containing gas supply apparatus 22. The oxygen-containing gas flows through the air supply pipe 60 into the first condenser 44 as the coolant. The oxygen-containing gas heated by heat exchange with the exhaust gas is supplied to the fuel cell stack 32.

At the second condenser 46, a circulation pipe 62 connected to the hot water tank 18 is provided. The water from the hot water tank 18 as the coolant is heated in the second condenser 46 by heat exchange with the exhaust gas, and the heated hot water returns to the hot water tank 18, through the circulation pipe 62.

The control device 16 at least regulates any of the flow rate of the exhaust gas supplied to the first condenser 44, and the flow rate of the exhaust gas supplied to the second condenser 46 based on at least any of the water level of the hot water in the hot water tank 18, the temperature of the hot water in the hot water tank 18, the water level of the condensed water in the condenser apparatus 14 (water level of the water container 54).

The control device 16 includes a hot water level comparator 64 for comparing the water level of the hot water with a predetermined water level range of the hot water, a hot water temperature comparator 66 for comparing the temperature of the hot water with a predetermined hot water temperature range, and a condensed water level comparator 68 for comparing the water level of the condensed water with a predetermined water level range of the condensed water. It is required to have at least one of the hot water level comparator 64, the hot water temperature comparator 66, and the condensed water level comparator 68.

The hot water tank 18 includes a water level meter (hot water level detector) 70 for detecting the water level of the hot water and a thermometer (hot water temperature detector) 72 for detecting the temperature of the hot water. The water container 54 includes a water level meter (condensed water level detector) 74 for detecting the water level of the condensed water in the water container 54.

The hot water tank 18 is connected to a water supply pipe 76 for supplying city water to the hot water tank 18 from the outside, a water discharge pipe 78 for discharging the hot water from the hot water tank 18, and a hot water supply pipe 80 for supplying hot water at predetermined temperature from the hot water tank 18. A valve 82 is provided in the water supply pipe 76, a valve 84 is provided in the water discharge pipe 78, and a valve 86 is provided in the hot water supply pipe 80.

Operation of the fuel cell system 10 having the above structure will be described below.

By operation of the fuel gas supply apparatus 20, for example, a raw fuel such as the city gas (including $CH_4$, $C_2H_6$, $C_3H_8$, $C_4H_{10}$) is supplied to the evaporator 36, and by operation of the water supply apparatus 24, water is supplied to the evaporator 36. Further, by operation of the oxygen-containing gas supply apparatus 22, the oxygen-containing gas such as the air is supplied to the heat exchanger 34 through the first condenser 44.

In the evaporator 36, the raw fuel is mixed with the water vapor, and thus a mixed fuel is obtained. The mixed fuel is supplied to the inlet of the reformer 38. The mixed fuel undergoes steam reforming in the reformer 38. Thus, hydrocarbon of $C_{2+}$ is removed (reformed), thereby to obtain a fuel gas chiefly containing methane. The fuel gas flows from the exit of the reformer 38 into the fuel cell stack 32. Thus, methane in the fuel gas is reformed, thereby to obtain hydrogen gas. The fuel gas chiefly containing the hydrogen gas is supplied to the anode (not shown).

When the air supplied to the heat exchanger 34 moves through the heat exchanger 34, the air is heated beforehand to a predetermined temperature by heat exchange with the exhaust gas as described later. The air heated by the heat exchanger 34 flows into the fuel cell stack 32, and is supplied to the cathode (not shown).

Thus, in the electrolyte electrode assembly 26, power generation is performed by electrochemical reactions of the fuel gas and the air. The hot exhaust gas (of several hundred ° C.) discharged to the outside of each electrolyte electrode assembly 26 flows through the heat exchanger 34, and heat exchange between the exhaust gas and the air is performed. As a result, the exhaust gas heats the air to a desired temperature, and the temperature of the exhaust gas is lowered. The exhaust gas is supplied to the evaporator 36 to evaporate water. After the exhaust gas passes through the evaporator 36, the exhaust gas is supplied from the main exhaust pipe 42 to the condenser apparatus 14 through the exhaust pipe 40.

Next, a control method according to the first embodiment in the condenser apparatus 14 will be described with reference to a flow chart shown in FIG. 2 and a control map shown in FIG. 3.

Firstly, in order to define a range of a hot water level Q in the hot water tank 18, a water level lower limit $Q_{min}$ of the hot water and a water level upper limit $Q_{max}$ of the hot water are determined. The lower limit $Q_{min}$ is positioned above an ejection port of the tank 18, the ejection port being connected to the circulation pipe 62 extending to the condenser apparatus 14, and the water level upper limit $Q_{max}$ is positioned at a height corresponding to 95% of the full capacity of the hot water tank 18.

The temperature T of the hot water in the hot water tank 18 has a lower limit hot water temperature $T_{min}$ of, for example, 60° C. The temperature T of the hot water in the hot water tank 18 has an upper limit hot water temperature $T_{max}$ of, for example, 80° C. The lower limit temperature $T_{min}$ and the upper limit temperature $T_{max}$ can be set as necessary.

As the water level W of the condensed water in the water container 54, a water level lower limit $W_{min}$ is set. The lower limit $W_{min}$ of the condensed water is positioned at a height corresponding to the amount of condensed water required to stop operation of the fuel cell module 12 at the time of stopping the fuel cell system 10.

For this purpose, in the control device 16, the hot water level comparator 64 compares the water level of the hot water in the hot water tank 18 detected by the water level meter 70 with the predetermined water level range of the hot water. If it is determined that the detected water level Q of the hot water is the upper limit $Q_{max}$ or less (YES in step S1), the control proceeds to step S2.

In step S2, it is determined whether the water level Q of the hot water is the lower limit $Q_{min}$ or more. If it is determined that the water level Q of the hot water is the lower limit $Q_{min}$ or more (YES in step S2), the control proceeds to step S3. In step S3, the temperature T of the hot water detected by the thermometer 72 is compared with the predetermined temperature range of the hot water, i.e., the upper limit $T_{max}$ by the hot water temperature comparator 66. If it is determined that the temperature T of the hot water is the upper limit $T_{max}$ of the hot water or less (YES in step S3), the control proceeds to step S4 for performing water cooling processing (see B and E in FIG. 3).

As shown in FIG. 1, in the water cooling processing, the regulator valve 48 is controlled such that the flow rate of the exhaust gas supplied to the second condenser 46 becomes larger than the flow rate of the exhaust gas supplied to the first condenser 44. In this case, it is sufficient that the flow rate of the exhaust gas supplied to the second condenser 46 is larger than the flow rate of the exhaust gas supplied to the first condenser 44, and no exhaust gas may be supplied to the first condenser 44.

Thus, since a relatively large amount of the exhaust gas is supplied to the second condenser 46, the amount of hot water stored in the hot water tank 18 is increased and the temperature of the hot water stored in the hot water tank 18 is increased.

Further, in step S3, if it is determined that the temperature T of the hot water exceeds the upper limit $T_{max}$, (NO in step S3), the control proceeds to step S5. In step S5, the condensed water level comparator 68 compares the water level W of the condensed water in the water container 54 detected by the water level meter 74 with the predetermined water level range of the condensed water, i.e., the lower limit $W_{min}$.

If it is determined that the water level W of the condensed water is the lower limit value $W_{min}$ or more (YES in step S5), the control proceeds to step S6 for performing air cooling processing (see H in FIG. 3). The regulator valve 48 is controlled such that the flow rate of the exhaust gas supplied to the first condenser 44 becomes larger than the flow rate of the exhaust gas supplied to the second condenser 46.

If it is determined that the water level W of the condensed water is less than the lower limit $W_{min}$ (NO in step 5), the control proceeds to step S7 for performing water cooling processing (see Ha in FIG. 3). In step S7, the flow of the exhaust gas is controlled such that the flow rate of the exhaust gas supplied to the second condenser 46 becomes larger than the flow rate of the exhaust gas supplied to the first condenser 44.

If it is determined that the hot water level Q in the hot water tank 18 is less than the lower limit $Q_{min}$ (NO in step S2), the control proceeds to step S8 for performing water cooling processing (see A, D, and G in FIG. 3). In step S8, the flow of the exhaust gas is controlled such that the flow rate of the exhaust supplied to the second condenser 46 becomes larger than the flow rate of the exhaust gas supplied to the first condenser 44.

Further, in step S1, if it is determined that the water level Q of the hot water in the hot water tank 18 exceeds the upper limit $Q_{max}$ (NO in step S1), the control proceeds to step S9 for comparing the temperature T of the hot water with the predetermined temperature range of the hot water. Then, if it is determined that the temperature T of the hot water is the upper limit $T_{max}$ or less, and is the lower limit $T_{min}$ or more (YES in step S9 and YES in step S10), then the control proceeds to step S11.

In step S11, if it is determined that the water level W of the condensed water in the water container 54 is the lower limit $W_{min}$ or more (YES in step S11), the control proceeds to step S12 for performing the air cooling processing (see F in FIG. 3). On the other hand, if it is determined that the water level W of the condensed water is less than the lower limit $W_{min}$ (NO in step S11), the control proceeds to step S13 for performing water cooling processing (see Fa in FIG. 3).

Further, in step S10, if it is determined that the temperature T of the hot water is less than the lower limit $T_{min}$ (NO in step S10), the control proceeds to step S14 for performing water cooling processing (see C in FIG. 3).

Further, in step S9, if it is determined that the temperature T of the hot water exceeds the upper limit $T_{max}$ (NO in step S9), the control proceeds to step S15 for comparing the water level W of the condensed water in the water container 54 with the predetermined water level of the condensed water. If it is determined that the water level W of the condensed water is the lower limit $W_{min}$ or more (YES in step S15), the control proceeds to step S16 for performing air cooling processing (see I in FIG. 3). On the other hand, if it is determined that the water level W of the condensed water is less than the lower limit $W_{min}$ (NO in step S15), the control proceeds to step S17 for performing water cooling processing (see Ia in FIG. 3).

In the first embodiment, the condenser apparatus 14 includes the first condenser 44 using the oxygen-containing gas as the coolant and the second condenser 46 using the hot water stored in the hot water tank 18 as the coolant. The fuel cell system 10 includes the control device 16 for regulating at least one of the flow rate of the exhaust gas supplied to the first condenser 44 and the flow rate of the exhaust gas supplied to the second condenser 46 based on at least one of the water level Q of the hot water in the hot water tank 18, the temperature T of the hot water in the hot water tank 18, and the water level W of the condensed water in the water container 54.

In the system, the first condenser 44 serving as the air cooling condenser and the second condenser 46 serving as the water cooling condenser can be used selectively, or used in combination at a predetermined ratio of exhaust gas flow rates. Thus, heat energy can be recovered from the exhaust gas. Water self-sustaining operation can be performed, and reduction in the temperature of the exhaust gas is achieved.

Further, depending on the state of the hot water tank 18, i.e., depending on the temperature T of the hot water in the hot water tank 18 and the amount of the hot water (water level Q of the hot water), it is not required to stop operation of the fuel cell stack 32, and thus the power generation output is not affected adversely. Therefore, it becomes possible to supply the required electrical energy to the loads easily and reliably.

Further, in the fuel cell system 10, regardless of the capacity of the hot water tank 18, the number of start and stop operations is decreased, and improvement in the power generation efficiency is achieved easily.

Further, the first condenser 44 and the second condenser 46 are used selectively, or used in combination depending on the state of the hot water (i.e., the temperature and the amount of the hot water) in the hot water tank 18 and the state of the condensed water (amount of condensed water) in the water container 54. Thus, a desired temperature T of the hot water can be maintained suitably.

Further, the control device 16 includes the hot water level comparator 64 for comparing the water level Q of the hot water with the predetermined water level range of the hot water, the hot water temperature comparator 66 for comparing the temperature T of the hot water with the predetermined temperature range of the hot water, and the condensed water level comparator 68 for comparing the water level W of the condensed water with the predetermined water level range of the condensed water.

Thus, based on the comparison results of at least any of the water level Q of the hot water, the temperature T of the hot water, and the water level W of the condensed water, heat energy can be recovered by the first condenser 44 serving as the air cooling condenser and the second condenser 46 serving as the water cooling condenser. Thus, water self-sustaining operation is performed, and reduction in the temperature of the exhaust gas is achieved.

Further, the power generation output is not affected by the state of the hot water, and it becomes possible to supply the required electrical energy to the loads reliably. Additionally, since start and stop operations are cut down as much as possible, improvement in the power generation efficiency is achieved. Moreover, by selectively using the first condenser 44 and the second condenser 46 depending on the state of the hot water and the state of the condensed water, the temperature T of the hot water can be maintained easily.

Further, the hot water tank 18 includes the water level meter 70 for detecting the water level Q of the hot water, and the thermometer 72 for detecting the temperature T of the hot water. Therefore, the state of the hot water, i.e., the amount (water level) of the hot water and the temperature of the hot water can be detected reliably. Further, by suitably regulating the amount of the exhaust gas supplied to the first condenser 44 and the amount of the exhaust gas supplied to the second condenser 46, water self-sustaining operation is performed, and it becomes possible to supply the required electrical energy to the loads reliably. Further, the temperature of the hot water can be maintained easily.

Moreover, the condenser apparatus 14 includes the water container 54 for storing the condensed water, and the water level meter 74 for detecting the water level W of the condensed water in the water container 54. In the structure, the state of the condensed water, i.e., the amount of the condensed water can be detected reliably. Further, by suitably regulating the flow rate of the exhaust gas supplied to the first condenser 44 and the flow rate of the exhaust gas supplied to the second condenser 46, it becomes possible to perform water self-sustaining operation, and supply required electrical energy to the loads. Further, the desired temperature of the hot water is maintained easily.

Further, the fuel cell system 10 includes the regulator valve 48 for regulating the flow rate of the exhaust gas supplied to the first condenser 44 and the flow rate of the exhaust gas supplied to the second condenser 46. In the structure, the flow rate of the exhaust gas supplied to the first condenser 44 and the flow rate of the exhaust gas supplied the second condenser 46 can be regulated suitably, it becomes possible to perform water self-sustaining operation, and supply required electrical energy to the loads. Further, the desired temperature of the hot water is maintained easily.

Further, the fuel cell module 12 includes the fuel cell stack 32, the heat exchanger 34, the evaporator 36, and the reformer 38. Thus, in particular, the present invention is suitably applicable to the fuel cell module 12 that performs steam reforming, and advantageous effects are obtained.

Further, the fuel cell module 12 comprises a high temperature fuel cell system, e.g., made up of a solid oxide fuel cell (SOFC) module to achieve the desired advantages. Instead of the solid oxide fuel cell module, the present invention is suitably applicable to other high temperature type fuel cell modules or medium temperature type fuel cell modules. For example, molten carbonate fuel cells (MCFC), phosphoric acid fuel cells (PAFC), hydrogen membrane fuel cells (HMFC) or the like may be adopted suitably.

Further, the control method at least includes any of the step of comparing the water level Q of the hot water with the predetermined water level range of hot water, the step of comparing the temperature T of the hot water with the predetermined temperature range of the hot water, and the step of comparing the water level W of the condensed water with the predetermined water level range of the condensed water.

Thus, based on the comparison results of at least any of the water level Q of the hot water, the temperature T of the hot water, and the water level W of the condensed water, heat energy can be recovered from the exhaust gas by the first condenser 44 serving as the air cooling condenser and the second condenser 46 serving as the water cooling condenser. Thus, water self-sustaining operation can be performed, and reduction in the temperature of the exhaust gas can be achieved.

Further, the power generation output is not affected by the state of the hot water, and it becomes possible to supply the required electrical energy to the loads reliably. Additionally, since the number of start and stop operations is suppressed as much as possible, improvement in the power generation efficiency is achieved. Moreover, by selectively using the first condenser 44 and the second condenser 46 depending on the state of the hot water and the state of the condensed water, the temperature T of the hot water can be maintained easily.

Figure 2:
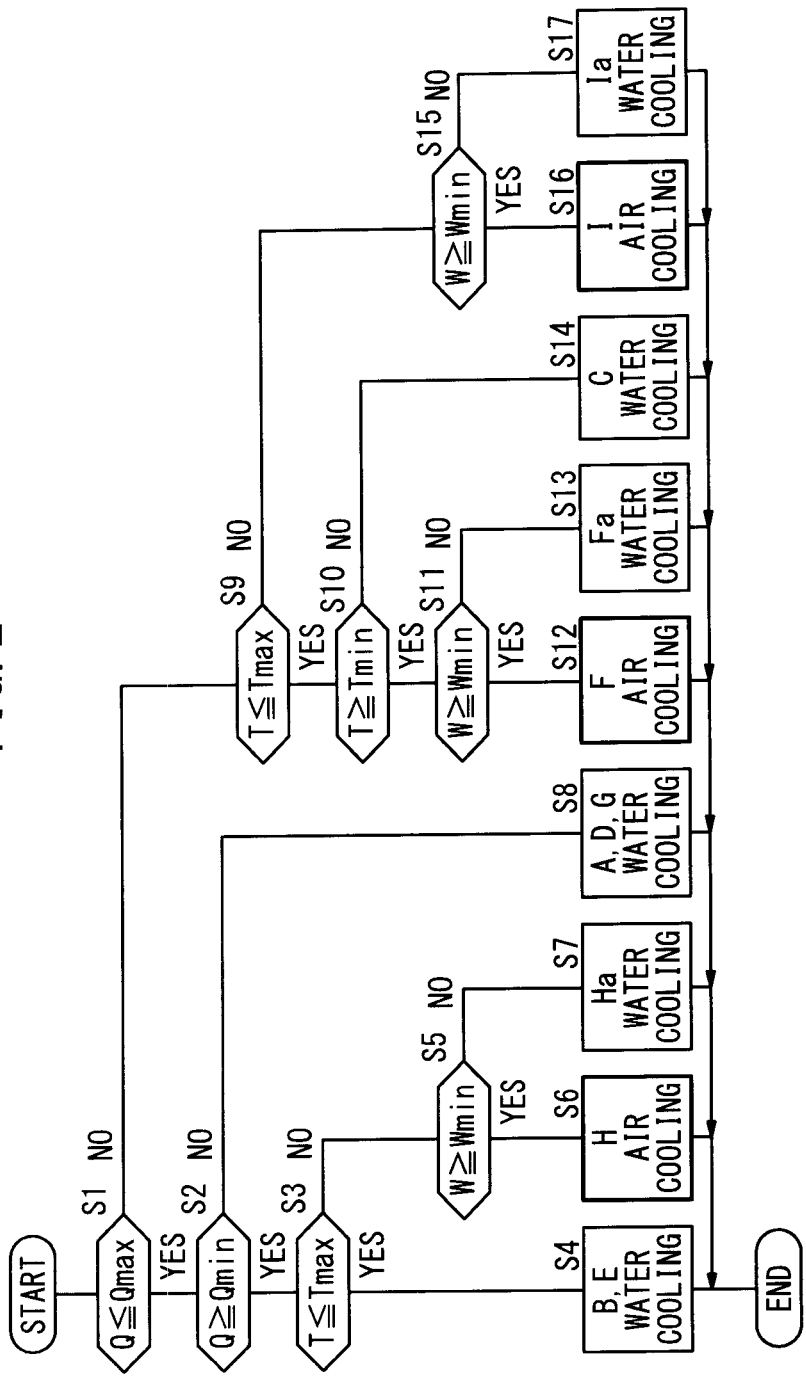
FIG. 2 is a flow chart showing a control method according to a first embodiment of the present invention.

Further, in the control method, if the water level Q of the hot water is within the predetermined water level range of the hot water and the temperature T is within or less than the predetermined temperature range of the hot water, then the flow of the exhaust gas is controlled such that the flow rate of the exhaust gas supplied to the second condenser 46 becomes larger than the flow rate of the exhaust gas supplied to the first condenser 44 (see B, E in FIGS. 2 and 3).

Thus, since heat exchange (water cooling) between the hot water and the exhaust gas is mainly performed by the second condenser 46, heat recovery efficiency is improved, and the condensed water can be recovered reliably. As a result, it becomes possible to supply the required electrical energy to the loads. Further, since start and stop operations are cut down as much as possible, improvement in the power generation efficiency is achieved, and the temperature T of the hot water is maintained easily.

Further, in the control method, if the water level Q of the hot water is within the predetermined water level range of the hot water, the temperature T of the hot water exceeds the predetermined temperature range of the hot water, and the water level W of the condensed water is within or exceeds the predetermined water level range of the condensed water, then the flow of the exhaust gas is regulated such that the flow rate of the exhaust gas supplied to the first condenser 44 becomes larger than the flow rate of the exhaust gas supplied to the second condenser 46 (see H in FIGS. 2 and 3).

Thus, heat exchange (air cooling) between the oxygen-containing gas and the exhaust gas is mainly performed by the first condenser 44, and it becomes possible to supply the required electrical energy to the loads reliably. Heat energy can be recovered from the exhaust gas, and it becomes possible to perform water self-sustaining operation. Further, reduction in the temperature of the exhaust gas is achieved. Moreover, since start and stop operations are cut down as much as possible, improvement in the power generation efficiency is achieved.

Further, in the control method, if the water level Q of the hot water is within the predetermined water level range of the hot water, the temperature T of the hot water exceeds the predetermined hot water temperature range, and the water level W of the condensed water is less than the predetermined water range of the condensed water, then the flow of the exhaust gas is regulated such that the flow rate of the exhaust gas supplied to the second condenser 46 becomes larger than the flow rate of the exhaust gas supplied to the first condenser 44 (see Ha in FIGS. 2 and 3).

Thus, since heat exchange (water cooling) between the hot water and the exhaust gas is mainly performed by the second condenser 46, heat recovery efficiency is improved, and the condensed water can be recovered reliably. As a result, it becomes possible to supply the required electrical energy to the loads. Further, since start and stop operations are cut down as much as possible, improvement in the power generation efficiency is achieved, and the temperature T of the hot water is maintained easily.

Further, in the control method, if the water level Q of the hot water is less than the predetermined water level range of the hot water, then the flow of the exhaust gas is controlled such that the flow rate of the exhaust gas supplied to the second condenser 46 becomes larger than the flow rate of the exhaust gas supplied to the first condenser (see A, D, and G in FIGS. 2 and 3).

Thus, since heat exchange (water cooling) between the hot water and the exhaust gas is mainly performed by the second condenser 46, improvement in the heat recovery efficiency is achieved, and the condensed water can be recovered reliably. Therefore, it becomes possible to supply the required electrical energy to the loads reliably. Further, since start and stop operations are cut down as much as possible, improvement in the power generation efficiency is achieved, and the temperature T of the hot water is maintained easily.

Further, in the control method, if the water level Q of the hot water exceeds the predetermined water level range of the hot water, the temperature T of the hot water is within the predetermined temperature range of the hot water, and the water level W of the condensed water is within or exceeds the predetermined water level range of the condensed water, then the flow of the exhaust gas is regulated such that the flow rate of the exhaust gas supplied to the first condenser 44 becomes larger than the flow rate of the exhaust gas supplied to the second condenser 46 (see F in FIGS. 2 and 3).

Thus, heat exchange (air cooling) between the oxygen-containing gas and the exhaust gas is mainly performed by the first condenser 44. Thus, it becomes possible to supply the required electrical energy to the loads. Further, it becomes possible to recover heat energy from the exhaust gas, and perform water self-sustaining operation. Reduction in the temperature of the exhaust gas is achieved. Moreover, since start and stop operations are cut down as much as possible, improvement in the power generation efficiency is achieved.

Further, in the control method, if the water level Q of the hot water exceeds the predetermined water level range of the hot water, the temperature T of the hot water is within the predetermined temperature range of the hot water, and the water level W of the condensed water is less than the predetermined water level range of the condensed water, then the flow of the exhaust gas is controlled such that the flow rate of the exhaust gas supplied to the second condenser 46 becomes larger than the flow rate of the exhaust gas supplied to the first condenser 44 (see Fa in FIGS. 2 and 3).

Thus, heat exchange (water cooling) between the hot water and the exhaust gas is performed mainly by the second condenser 46. Improvement in the heat recovery efficiency is achieved, and the condensed water can be recovered reliably. Therefore, it becomes possible to supply the required electrical energy to the loads. Further, since start and stop operations are cut down as much as possible, improvement in the power generation efficiency is achieved, and the temperature T of the hot water is maintained easily.

Further, in the control method, if the water level Q of the hot water exceeds the predetermined water level range of the hot water, and the temperature of the hot water is less than the predetermined temperature range of the hot water, then the flow of the exhaust gas is controlled such that the flow rate of the exhaust gas supplied to the second condenser 46 becomes larger than the flow rate of the exhaust gas supplied to the first condenser 44 (see C in FIGS. 2 and 3).

Thus, heat exchange (water cooling) between the hot water and the exhaust gas is performed mainly by the second condenser 46. Improvement in the heat recovery efficiency is achieved, and the condensed water can be recovered reliably. Therefore, it becomes possible to supply the required electrical energy to the loads. Further, since start and stop operations are cut down as much as possible, improvement in the power generation efficiency is achieved, and the temperature T of the hot water is maintained easily.

Further, in the control method, if the water level Q of the hot water exceeds the predetermined water level range of the hot water, the temperature T of the hot water exceeds the predetermined temperature range of the hot water, and the water level W of the condensed water is within or exceeds the predetermined water level range of the condensed water, then the flow of the exhaust gas is controlled such that the flow rate of the exhaust gas supplied to the first condenser 44 becomes larger than the flow rate of the exhaust gas supplied to the second condenser 46 (see I in FIGS. 2 and 3).

Thus, heat exchange (air cooling) between the oxygen-containing gas and the exhaust gas is mainly performed by the first condenser 44. Thus, it becomes possible to supply the required electrical energy to the loads reliably. Further, it becomes possible to recover heat energy from the exhaust gas, and perform water self-sustaining operation. Reduction in the temperature of the exhaust gas is achieved. Moreover, since start and stop operations are cut down as much as possible, improvement in the power generation efficiency is achieved.

Further, in the control method, if the water level Q of the hot water exceeds the predetermined water level range of the hot water, the temperature T of the hot water exceeds the predetermined temperature range of the hot water, and the water level W of the condensed water is less than the predetermined water level range of the condensed water, then the flow of the exhaust gas is regulated such that the flow rate of the exhaust gas supplied to the second condenser 46 becomes larger than the flow rate of the exhaust gas supplied to the first condenser 44 (See Ia in FIGS. 2 and 3).

Thus, heat exchange (water cooling) between the hot water and the exhaust gas is performed mainly by the second condenser 46. Thus, improvement in the heat recovery efficiency is achieved, and the condensed water can be recovered reliably. Therefore, it becomes possible to supply the required electrical energy to the loads. Further, since start and stop operations are cut down as much as possible, improvement in the power generation efficiency is achieved, and the temperature T of the hot water is maintained easily.

Figure 4:
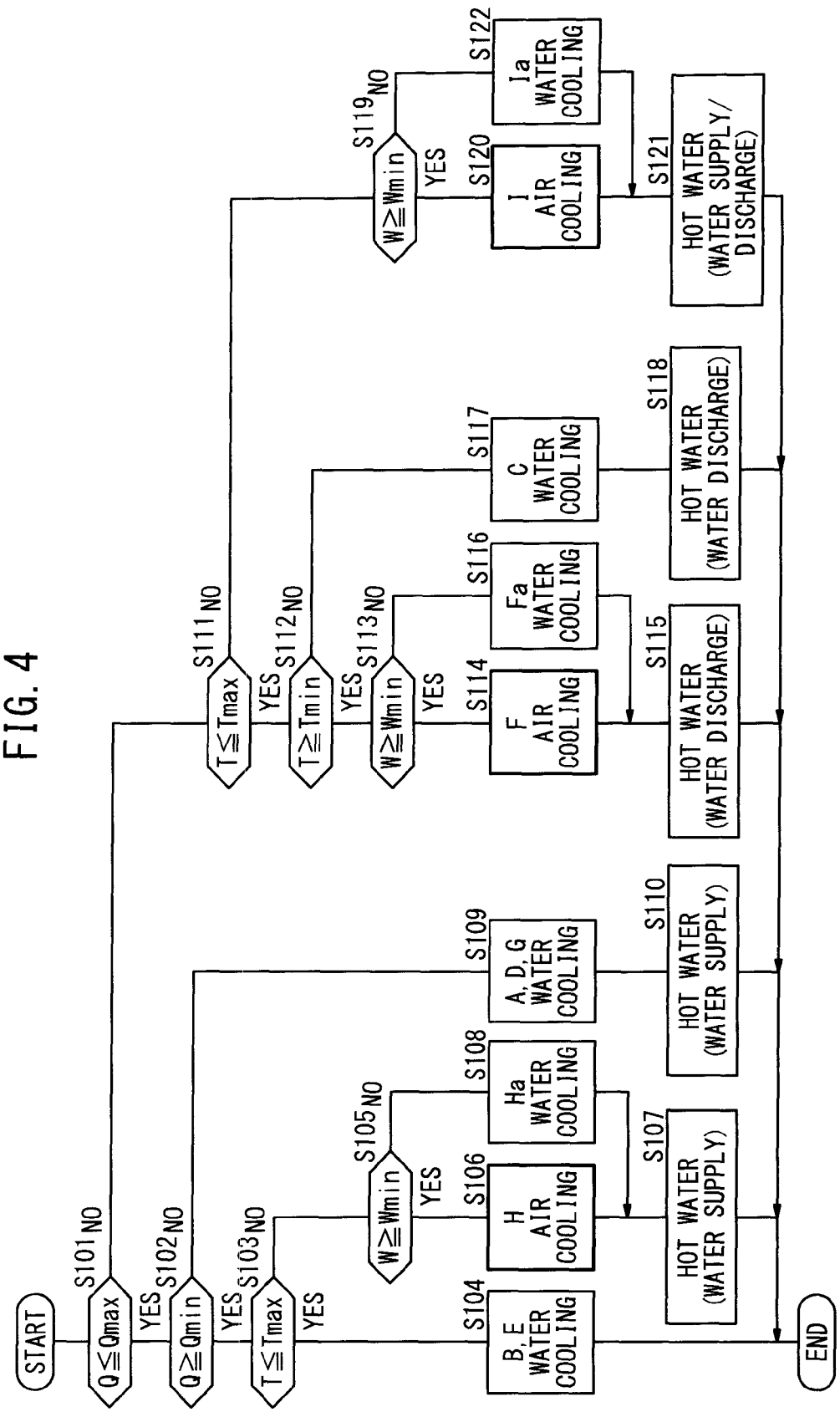
FIG. 4 is a flow chart showing a control method according to a second embodiment of the present invention.

FIG. 4 is a flow chart showing a control method according to a second embodiment of the present invention. Description regarding the steps that are identical to those of the control method according to the first embodiment will be omitted.

In the control method, if the water level Q of the hot water is within the predetermined water level of the hot water, the temperature T of the hot water exceeds the predetermined temperature range of the hot water, and the water level W of the condensed water is within or exceeds the predetermined water level range of the condensed water (steps S101 to S103 and S105), then the control proceeds to step S106. In step S106, the flow of the exhaust gas is regulated such that the flow rate of the exhaust gas supplied to the first condenser 44 becomes larger than the flow rate of the exhaust gas supplied to the second condenser 46.

Then, the control proceeds to step S107 for supplying water to the hot water tank 18. That is, since the temperature T of the hot water exceeds the predetermined temperature range of the hot water, the valve 82 is opened, and city water is supplied from the water supply pipe 76 to the hot water tank 18. As a result, it becomes possible to decrease the temperature T of the hot water in the hot water tank 18.

Further, in step S105, if the water level W of the condensed water is less than the predetermined water level range of the condensed water (NO in step S105), the control proceeds to step S108. In step S108, the flow of the exhaust gas is regulated such that the flow rate of the exhaust gas supplied to the second condenser 46 becomes larger than the flow rate of the exhaust gas supplied to the first condenser 44, thereby to increase the amount of condensed water stored in the water container 54. Then, the control proceeds to step S107, in which water is supplied to the hot water tank 18 thereby to reduce the temperature of the hot water.

Further, if the water level Q of the hot water is less than the predetermined water level range of the hot water (NO in step S102), the control proceeds to step S109, in which control is performed such that the flow rate of the exhaust gas supplied to the second condenser 46 becomes larger than the flow rate of the exhaust gas supplied to the first condenser 44. Then, the control proceeds to step S110 for supplying water to the hot water tank 18 thereby to increase the water level Q of the hot water in the hot water tank 18.

If the water level Q of the hot water exceeds the predetermined water level range of the hot water, the temperature T of the hot water is within the predetermined temperature range of the hot water, and the water level W of the condensed water is within or exceeds the predetermined water level range of the condensed water, the control proceeds to step S114. In step S114, the flow of the exhaust gas is regulated such that the flow rate of the exhaust gas supplied to the first condenser 44 becomes larger than the flow rate of the exhaust gas supplied to the second condenser 46, and then, the control proceeds to step S115. In step S115, the valve 84 is opened to discharge the hot water from the hot water tank 18 to the water discharge pipe 78, because the water level Q of the hot water exceeds the predetermined water level range of the hot water.

In step S113, if the water level W of the condensed water is less than the predetermined water level range of the condensed water (NO in step S113), the control proceeds to step S116. In step S116, the flow of the exhaust gas is regulated such that the flow rate of the exhaust gas supplied to the second condenser 46 becomes larger than the flow rate of the exhaust gas supplied to the first condenser 44, and then, the control proceeds to step S115 for discharging the hot water from the hot water tank 18.

If the water level Q of the hot water exceeds the predetermined water level range of the hot water and the temperature T of the hot water is less than the predetermined temperature range of the hot water (NO in step S112), then the control proceeds to step S117. In step S117, the flow of the exhaust gas is regulated such that the flow rate of the exhaust gas supplied to the second condenser 46 becomes larger than the flow rate of the exhaust gas supplied to the first condenser 44. Then, the control proceeds to step S118 for discharging the excessive hot water in the hot water tank 18 through the water discharge pipe 78.

If the water level Q of the hot water exceeds the predetermined water level range of the hot water, the temperature T of the hot water exceeds the predetermined temperature range of the hot water, and the water level W of the condensed water is within or exceeds the predetermined water level range of the condensed water, then the control proceeds to step S120. In step S120, the flow of the exhaust gas is regulated such that the flow rate of the exhaust gas supplied to the first condenser 44 becomes larger than the flow rate of the exhaust gas supplied to the second condenser 46. Then, control proceeds to step S121 for supplying water to the hot water tank 18, and discharging the hot water from the hot water tank 18. In the hot water tank 18, the hot water level exceeds the water level range of the hot water, and the hot water temperature exceeds the temperature range of the hot water. Therefore, water is supplied to the hot water tank 18, and the hot water is discharged from the hot water tank 18.

If the water level of the hot water exceeds the water level range of the hot water, the temperature of the hot water exceeds the temperature range of the hot water, and the water level of the condensed water is less than the water level range of the condensed water, then the control proceeds to step S122. In step S122, the flow of the exhaust gas is regulated such that the flow rate of the exhaust gas supplied to the second condenser 46 becomes larger than the flow rate of the exhaust gas supplied to the first condenser 44. Then, the control proceeds to step S121, because in the hot water tank 18, the water level of the hot water exceeds the water level range of the hot water and the temperature of the hot water exceeds the temperature range of the hot water.

Thus, in the second embodiment, the same advantages as in the case of the first embodiment are obtained. Further, by supplying water to the hot water tank 18 and/or discharging hot water from the hot water tank 18, a given amount of the hot water at a given temperature is stored in the hot water tank 18 at all times advantageously.

Figure 5:
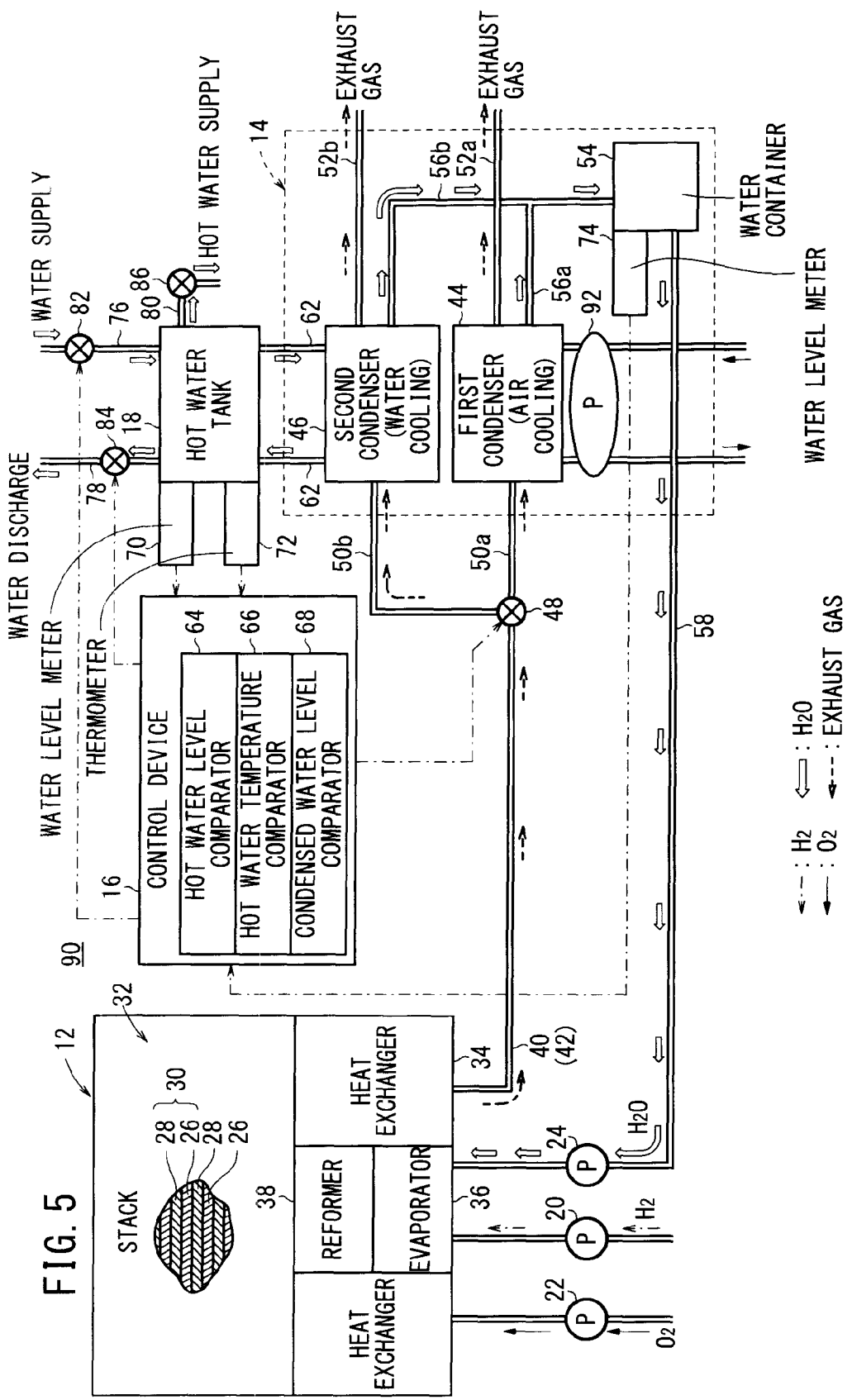
FIG. 5 is a diagram schematically showing structure of a fuel cell system according to a second embodiment of the present invention.

FIG. 5 is a diagram schematically showing a fuel cell system 90 according to a second embodiment of the present invention.

The constituent elements that are identical to those of the fuel cell system according to the first embodiment are labeled with the same reference numerals, and descriptions thereof will be omitted. Also in a third embodiment as described later, the constituent elements that are identical to those of the fuel cell system according to the first embodiment are labeled with the same reference numerals, and descriptions thereof will be omitted.

The fuel cell system 90 includes an air cooling fan 92 adjacent to the first condenser 44. Therefore, in the first condenser 44, it is possible to cool the exhaust gas discharged from the fuel cell stack 32 by external air supplied forcibly from the air cooling fan 92.

Figure 6:
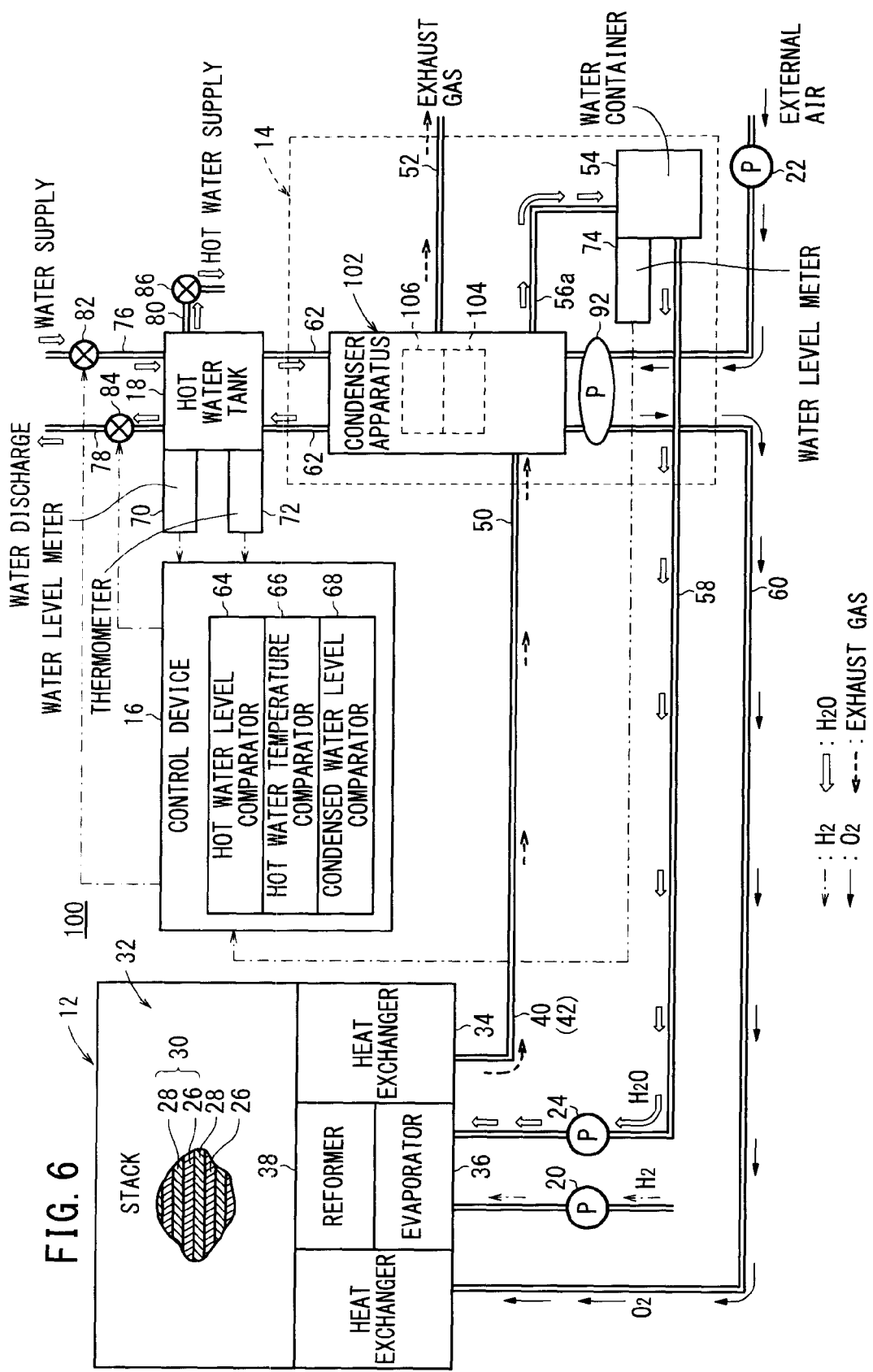
FIG. 6 is a diagram schematically showing structure of the fuel cell system according to a third embodiment of the present invention.
Figure 7:
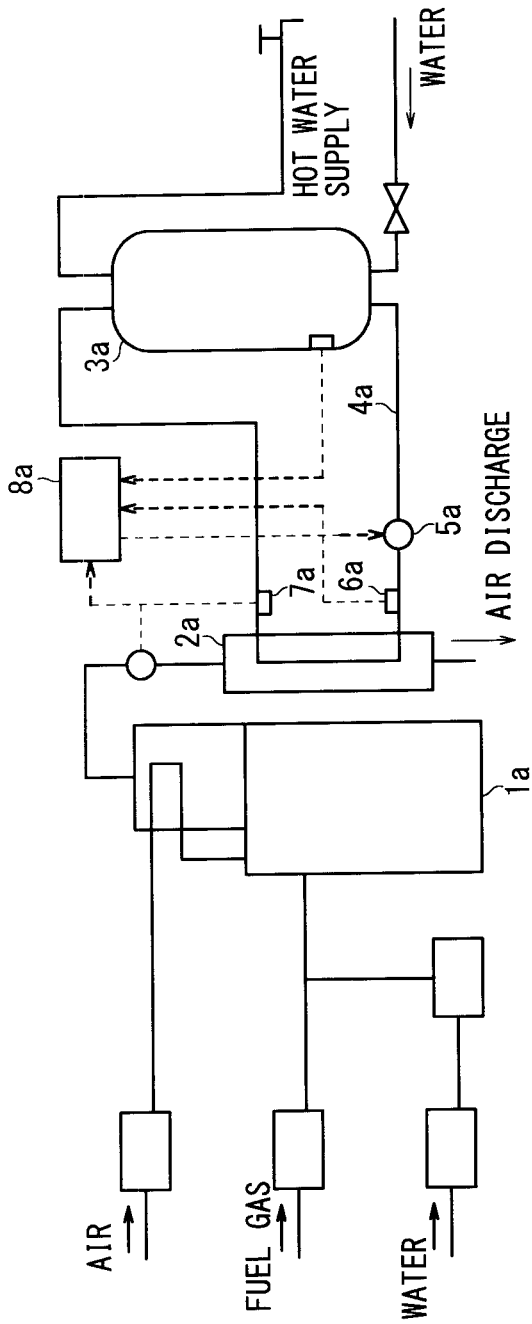
FIG. 7 is a diagram schematically showing a fuel cell system disclosed in Japanese Laid-Open Patent Publication No. 2006-024430.
Figure 8:
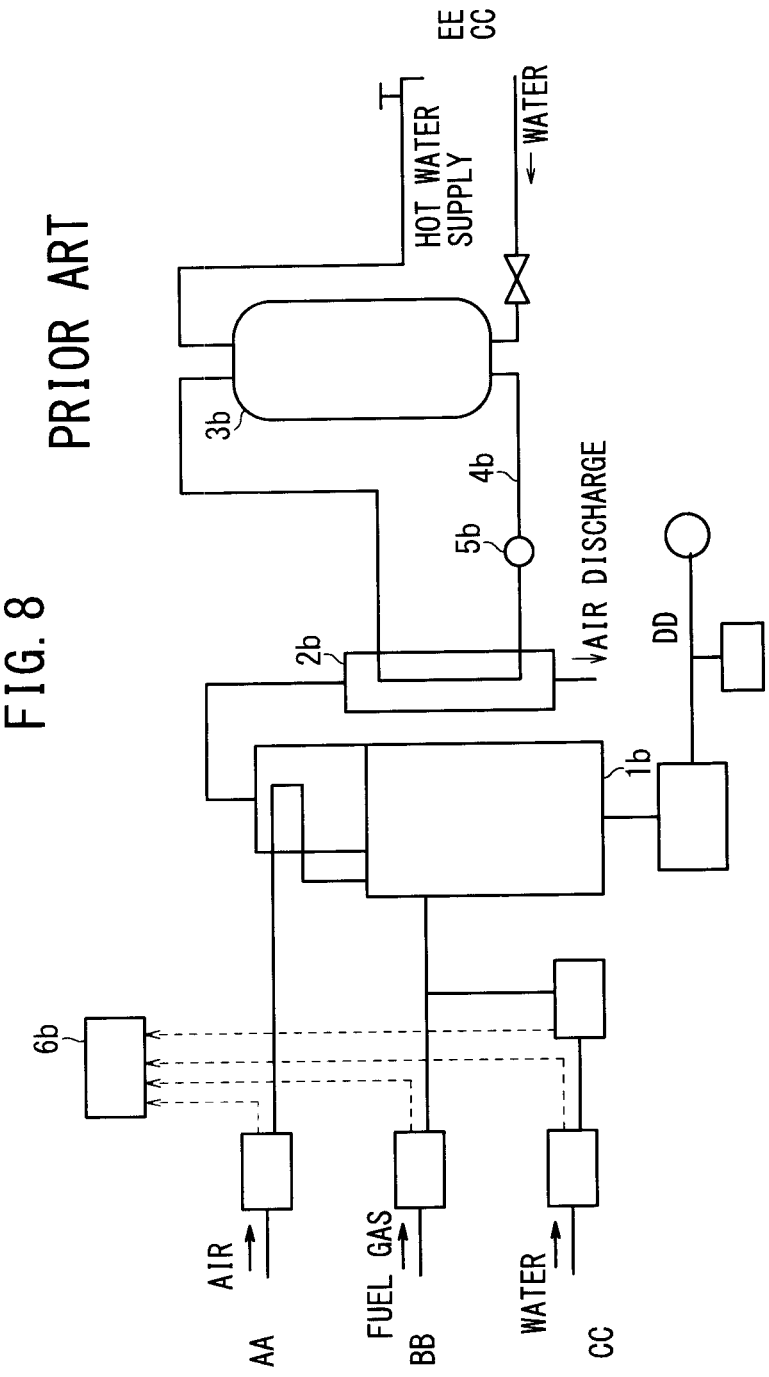
FIG. 8 is a diagram showing a fuel cell system disclosed in International Publication WO 2007/052633.

FIG. 6 is a diagram schematically showing a fuel cell system 100 according to the third embodiment of the present invention.

The fuel cell system 100 includes a condenser apparatus 102. A first condenser 104 serving as an air cooling condenser and a second condenser 106 serving as a water cooling condenser are provided together inside the condenser apparatus 102. Thus, in the third embodiment, the same advantages as in the case of the first embodiment are obtained. Moreover, further size reduction of the condenser apparatus 102 is achieved advantageously.

Although certain preferred embodiments of the present invention have been shown and described in detail, it should be understood that various changes and modifications may be made therein without departing from the scope of the appended claims.

The invention claimed is:

1. A fuel cell system, comprising:
    a fuel cell module for generating electricity by electrochemical reactions of a fuel gas and an oxygen-containing gas;
    a condenser apparatus for condensing water vapor in an exhaust gas discharged from the fuel cell module, by heat exchange between the exhaust gas and a coolant to recover the condensed water, and supplying the condensed water to the fuel cell module, the condenser apparatus including a first condenser using the oxygen-containing gas as the coolant and a second condenser using hot water stored in a hot water storage unit as the coolant; and
    a control device programmed to control a flow rate of the exhaust gas supplied to the first condenser and a flow rate of the exhaust gas supplied to the second condenser based on at least one of a water level of the hot water in the hot water storage unit, a temperature of the hot water in the hot water storage unit, and a water level of the condensed water in the condenser apparatus,
    wherein, based on the at least one of the water level of the hot water in the hot water storage unit, the temperature of the hot water in the hot water storage unit, and the water level of the condensed water in the condenser apparatus, the control device is programmed to change the flow rate of the exhaust gas supplied to the first condenser and the flow rate of the exhaust gas supplied to the second condenser such that one of the flow rate of the exhaust gas supplied to the first condenser and the flow rate of the exhaust gas supplied to the second condenser becomes larger than the other.

2. The fuel cell system according to claim 1, wherein the control device includes at least any of:
    a hot water level comparator for comparing the water level of the hot water with a predetermined water level range of the hot water;
    a hot water temperature comparator for comparing the temperature of the hot water with a predetermined temperature range of the hot water; and
    a condensed water level comparator for comparing the water level of the condensed water with a predetermined water level range of the condensed water, and
    the control device is programmed to control the flow rate of the exhaust gas supplied to the first condenser and the flow rate of the exhaust gas supplied to the second condenser based on at least one of comparisons made by the hot water level comparator, the hot water temperature comparator, and the condensed water level comparator.

3. The fuel cell system according to claim 1, wherein the hot water storage unit includes a hot water level detector for detecting the water level of the hot water, and a hot water temperature detector for detecting the temperature of the hot water, and
    the control device is programmed to control the flow rate of the exhaust gas supplied to the first condenser and the flow rate of the exhaust gas supplied to the second condenser based on at least one of the water level of the hot water detected by the hot water level detector, the temperature of the hot water detected by the hot water temperature sensor, and the water level of the condensed water in the condenser apparatus.

4. The fuel cell system according to claim 1, wherein the condenser apparatus includes a water container for storing the condensed water, and a condensed water level detector for detecting the water level of the condensed water in the water container, and
    the control device is programmed to control the flow rate of the exhaust gas supplied to the first condenser and the flow rate of the exhaust gas supplied to the second condenser based on at least one of the water level of the hot water in the hot water storage unit, the temperature of the hot water in the hot water storage unit, and the water level of the condensed water in the water container detected by the condensed water level detector.

5. The fuel cell system according to claim 1, further comprising a regulator valve for regulating the flow rate of the exhaust gas supplied to the first condenser and the flow rate of the exhaust gas supplied to the second condenser,
    wherein the control device is programmed to control the flow rate of the exhaust gas supplied to the first condenser and the flow rate of the exhaust gas supplied to the second condenser by controlling the regulator valve.

6. The fuel cell system according to claim 1, wherein the fuel cell module includes:
    a fuel cell stack formed by stacking a plurality of fuel cells, the fuel cells each formed by stacking an electrolyte electrode assembly and a separator, the electrolyte electrode assembly at least including an anode, a cathode, and an electrolyte interposed between the anode and the cathode;
    a heat exchanger for heating the oxygen-containing gas before the oxygen-containing gas is supplied to the fuel cell stack;
    an evaporator for evaporating the water to produce a mixed fuel of a raw fuel chiefly containing hydrocarbon and water vapor; and
    a reformer for reforming the mixed fuel to produce the fuel gas.

7. The fuel cell system according to claim 1, wherein the fuel cell module is a solid oxide fuel cell module.

8. A method of controlling a fuel cell system, the fuel cell system comprising:
    a fuel cell module for generating electricity by electrochemical reactions of a fuel gas and an oxygen-containing gas; and
    a condenser apparatus for condensing water vapor in an exhaust gas discharged from the fuel cell module, by heat exchange between the exhaust gas and a coolant to recover the condensed water, and supplying the condensed water to the fuel cell module, the condenser apparatus including a first condenser using the oxygen-containing gas as the coolant and a second condenser using hot water stored in a hot water storage unit as the coolant, the method comprising the steps of:

detecting at least one of a water level of the hot water in the hot water storage unit, a temperature of the hot water in the hot water storage unit, and a water level of the condensed water in the condenser apparatus; and controlling at least one of a flow rate of the exhaust gas supplied to the first condenser and a flow rate of the exhaust gas supplied to the second condenser based on the at least one of the water level of the hot water, the temperature of the hot water, and the water level of the condensed water detected in the detecting step, wherein, based on the at least one of the water level of the hot water, the temperature of the hot water, and the water level of the condensed water detected in the detecting step, at least one of the flow rate of the exhaust gas supplied to the first condenser and the flow rate of the exhaust gas supplied to the second condenser is changed such that one of the flow rate of the exhaust gas supplied to the first condenser and the flow rate of the exhaust gas supplied to the second condenser becomes larger than the other.

9. The control method according to claim 8, further comprising at least one of the steps of:

comparing the water level of the hot water with a predetermined water level range of the hot water;

comparing the temperature of the hot water with a predetermined temperature range of the hot water; and comparing the water level of the condensed water with a predetermined water level range of the condensed water.

10. The control method according to claim 9, wherein if the water level of the hot water is within the predetermined water level range of the hot water, and the temperature of the hot water is within or less than the predetermined temperature range of the hot water, then the flow of the exhaust gas is controlled such that the flow rate of the exhaust gas supplied to the second condenser becomes larger than the flow rate of the exhaust gas supplied to the first condenser.

11. The control method according to claim 9, wherein if the water level of the hot water is within the predetermined water level range of the hot water, the temperature of the hot water exceeds the predetermined temperature range of the hot water, and the water level of the condensed water is within or exceeds the predetermined water level range of the condensed water, then the flow of the exhaust gas is controlled such that the flow rate of the exhaust gas supplied to the first condenser becomes larger than the flow rate of the exhaust gas supplied to the second condenser.

12. The control method according to claim 9, wherein if the water level of the hot water is within the predetermined water level range of the hot water, the temperature of the hot water exceeds the predetermined temperature range of the hot water, and the water level of the condensed water is less than the predetermined water level range of the condensed water, then the flow of the exhaust gas is controlled such that the flow rate of the exhaust gas supplied to the second condenser becomes larger than the flow rate of the exhaust gas supplied to the first condenser.

13. The control method according to claim 9, wherein if the water level of the hot water is less than the predetermined water level range of the hot water, then the flow of the exhaust gas is controlled such that the flow rate of the exhaust gas supplied to the second condenser becomes larger than the flow rate of the exhaust gas supplied to the first condenser.

14. The control method according to claim 9, wherein if the water level of the hot water exceeds the predetermined water level range of the hot water, the temperature of the hot water is within the predetermined temperature range of the hot water, and the water level of the condensed water is within or exceeds the predetermined water level range of the condensed water, then the flow of the exhaust gas is controlled such that the flow rate of the exhaust gas supplied to the first condenser becomes larger than the flow rate of the exhaust gas supplied to the second condenser.

15. The control method according to claim 9, wherein if the water level of the hot water exceeds the predetermined water level range of the hot water, the temperature of the hot water is within the predetermined temperature range of the hot water, and the water level of the condensed water is less than the predetermined water level range of the condensed water, then the flow of the exhaust gas is controlled such that the flow rate of the exhaust gas supplied to the second condenser becomes larger than the flow rate of the exhaust gas supplied to the first condenser.

16. The control method according to claim 9, wherein if the water level of the hot water exceeds the predetermined water level range of the hot water and the temperature of the hot water is less than the predetermined temperature range of the hot water, then the flow of the exhaust gas is controlled such that the flow rate of the exhaust gas supplied to the second condenser becomes larger than the flow rate of the exhaust gas supplied to the first condenser.

17. The control method according to claim 9, wherein if the water level of the hot water exceeds the predetermined water level range of the hot water, the temperature of the hot water exceeds the predetermined temperature range of the hot water, and the water level of the condensed water is within or exceeds the water level range of the condensed water, then the flow of the exhaust gas is controlled such that the flow rate of the exhaust gas supplied to the first condenser becomes larger than the flow rate of the exhaust gas supplied to the second condenser.

18. The control method according to claim 9, wherein if the water level of the hot water exceeds the predetermined water level range of the hot water, the temperature of the hot water exceeds the predetermined temperature range of the hot water, and the water level of the condensed water is less than the predetermined water level range of the condensed water, then the flow of the exhaust gas is controlled such that the flow rate of the exhaust gas supplied to the second condenser becomes larger than the flow rate of the exhaust gas supplied to the first condenser.

19. The control method according to claim 8, wherein the fuel cell module includes:

a fuel cell stack formed by stacking a plurality of fuel cells, the fuel cells each formed by stacking an electrolyte electrode assembly and a separator, the electrolyte electrode assembly at least including an anode, a cathode, and an electrolyte interposed between the anode and the cathode;

a heat exchanger for heating the oxygen-containing gas before the oxygen-containing gas is supplied to the fuel cell stack;

an evaporator for evaporating the water to produce a mixed fuel of a raw fuel chiefly containing hydrocarbon and water vapor; and a reformer for reforming the mixed fuel to produce the fuel gas.

20. The control method according to claim 8, wherein the fuel cell module is a solid oxide fuel cell module.

21. The fuel cell system according to claim 1, further comprising:
- an exhaust pipe that connects the fuel cell module with the condenser apparatus and communicates the exhaust gas from the fuel cell module to the condenser apparatus, wherein the exhaust pipe includes a base exhaust gas channel extending from the fuel cell module to a junction, a first exhaust gas channel extending from the junction to the first condenser, and a second exhaust gas channel extending from the junction to the second condenser, the base exhaust gas channel and the first exhaust gas channel communicating the exhaust gas to the first condenser, and the base exhaust gas channel and the second exhaust gas channel communicating the exhaust gas to the second condenser; and
- a regulator valve disposed along the exhaust pipe and for regulating the flow rate of the exhaust gas supplied to the first condenser via the first exhaust gas channel and the flow rate of the exhaust gas supplied to the second condenser via the second exhaust gas channel,
- wherein the control device is programmed to change the flow rate of the exhaust gas supplied to the first condenser and the flow rate of the exhaust gas supplied to the second condenser by controlling the regulator valve.

22. The fuel cell system according to claim 1, wherein the control device includes:
- a hot water level comparator for comparing the water level of the hot water with a predetermined water level range of the hot water;
- a hot water temperature comparator for comparing the temperature of the hot water with a predetermined temperature range of the hot water; and
- a condensed water level comparator for comparing the water level of the condensed water with a predetermined water level range of the condensed water, and the control device is programmed to control the flow of the exhaust gas such that the flow rate of the exhaust gas supplied to the second condenser becomes larger than the flow rate of the exhaust gas supplied to the first condenser when the water level of the hot water is within the predetermined water level range of the hot water, and the temperature of the hot water is within or less than the predetermined temperature range of the hot water.

* * * * *